United States Patent [19]

Tashiro et al.

[11] 4,122,318

[45] Oct. 24, 1978

[54] SWITCH DEVICE ADAPTED TO RESPOND TO OPERATION OF STEERING HANDLE

[75] Inventors: Manabu Tashiro, Wako; Akinori Sato, Machida, both of Japan

[73] Assignees: Stanley Electric Co., Ltd.; Honda Motor Co., Ltd., both of Tokyo, Japan

[21] Appl. No.: 796,138

[22] Filed: May 12, 1977

[30] Foreign Application Priority Data

May 20, 1976 [JP] Japan .................................. 51-58050

[51] Int. Cl.² .......................... H01H 3/16; B60Q 1/00
[52] U.S. Cl. ..................................... 200/61.54; 340/55
[58] Field of Search ............... 200/61.27, 61.3, 61.31, 200/61.34, 61.35, 61.36, 61.37, 61.38, 61.54; 340/54, 55, 56, 67, 73

[56] References Cited

U.S. PATENT DOCUMENTS

| | | | |
|---|---|---|---|
| 1,562,592 | 11/1925 | Saviers ................................. | 340/55 |
| 1,575,446 | 3/1926 | Miller ................................... | 340/67 |
| 1,608,751 | 11/1926 | Johns .................................. | 200/61.35 |
| 1,876,875 | 9/1932 | Douglas ............................. | 200/61.54 |
| 1,982,397 | 11/1934 | O'Donnell ........................ | 200/61.31 |
| 2,275,488 | 3/1942 | Bachmann ....................... | 200/61.31 |
| 2,343,778 | 3/1944 | Leonard ............................ | 200/61.31 |
| 2,667,545 | 1/1954 | Leonard ............................ | 200/61.31 |

*Primary Examiner*—James R. Scott
*Attorney, Agent, or Firm*—Flynn & Frishauf

[57] ABSTRACT

A switch device adapted to respond to operation of steering handle comprises a disc which rotates in cooperation with operation of the steering handle and which has a plurality of actuating pieces which in turn actuate a rotor having a contactor which contacts with a contact member disposed in opposite relationship with it.

20 Claims, 4 Drawing Figures

SWITCH DEVICE ADAPTED TO RESPOND TO OPERATION OF STEERING HANDLE

BACKGROUND OF THE INVENTION

The present invention relates to a lighting device of cornering lamp, and more particularly to a switch device which responds to operation of a steering handle so as to actuate a lighting device of cornering lamp.

There is known a cornering lamp which is provided in the front of a vehicle to illuminate a road surface in the advancing direction on a running road having sharp curves. Such a cornering lamp temporarily illuminates the road surface in the advancing direction and provides the driver with a better view when the illuminating light of the head lamp cannot give the driver a sufficient visual field of view during night riding on a road surface having many sharp curves. Such a lamp is required to light only when vehicle has come to such a sharp curve during night running, without lighting always.

However, in the conventional lamp, there is no suitable means for lighting the lamp and therefore the lamp could not perform the function of a cornering lamp in which a switch is operated to light the lamp when coming to a corner and to turn off the lamp after passing the corner. Although manual operation is thought as a possible means, it is very dangerous to turn on such a lighting switch on a corner which necessitates auxiliary illumination.

Accordingly, it is an object of the present invention to provide a switch device which is operated to light a cornering lamp for positively securing a visual field in the advancing direction when coming to a corner of a sharp curve and which is made to turn off the lamp after passing the corner of a sharp curve.

It is another object of the invention to provide a switch device which is adapted to respond to operation of the steering handle of the vehicle so as to light a cornering lamp.

SUMMARY OF THE INVENTION

According to one aspect of the invention, there is provided a switch device which is adapted to respond to operation of the steering handle of a vehicle and which comprises an actuating means fixed on a steering shaft to rotate in cooperation with operation of the steering handle and having a plurality of actuating pieces, a rotatable member having a contactor and which rotates over a given angle upon abutment by said actuating pieces, and a contact member disposed in opposite relationship with said contactor so as to contact with the contactor upon rotation of said rotatable member.

DETAILED DESCRIPTION

Figure 1:
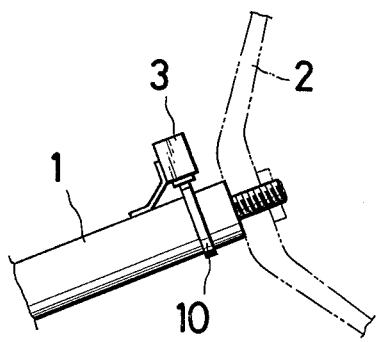
FIG. 1 is a view showing a switch device of the invention mounted on a vehicle.
Figure 2:
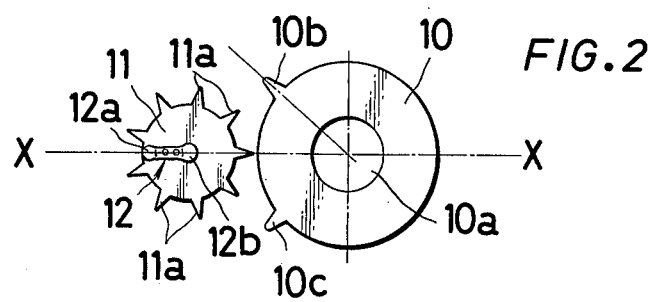
FIGS. 2 and 3 are front and side views showing the structure of one embodiment according to the invention.

Referring to FIGS. 1-4, there is shown a lighting device 3 of cornering lamp according to the invention mounted on a steering shaft 1 of a vehicle and adapted to perform a switching action with operation of a steering wheel or handle 2. The lighting device 3 of the cornering lamp is fixed on the steering shaft 1 and comprises a disc 10 adapted to rotate with operation of the steering handle 2, a rotor 11 adapted to rotate in response to rotation of the disc 10, a contactor 12 provided on the rotor 11, and a contact member 13 connected to contactor 12. The contact member 13 may be made by printing conductors on a board or the like.

The disc 10 of molded synthetic resin has a mounting bore 10a at its center for being mounted on the steering shaft 1 and also has projecting actuating pieces 10b and 10c at symmetrical positions of ±41° from the center in relation to a transverse axis X — X. The disc 10 is fixed around the steering shaft 1 by means of the mounting bore 10a and therefore rotates in response to operation of the steering handle 2. With the rotation of the disc 10, the rotor 11 rotates, as described hereinafter.

The rotor 11 has a plurality of projecting pieces 11a on the peripheral surface thereof and at a side thereof is fixed a contactor 12 which has contact pieces 12a and 12b at both ends thereof. The contactor 12 is arranged to position the contact piece 12b at the center of the rotor 11 and the contact piece 12a near the outer periphery of the rotor 11 whereby when the rotor 11 rotates, only the position of the contact piece 12a is changed.

Figure 3:
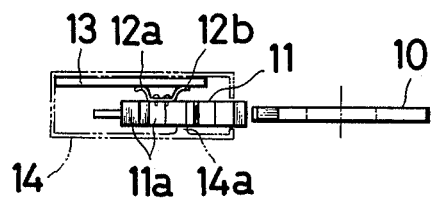

The projecting pieces 11a are arranged to abut with the actuating piece 10b or 10c and to be pressed by the latter in the right or left direction when the disc 10 rotates over the given value, whereby the rotor 11 rotates for one pitch. In this embodiment, the rotor 11 is rotatably supported on a rotary axis 14a protruding from a side wall of a casing 14, as shown in FIG. 3.

The contact member 13 is arranged at a position opposing the contactor 12 and has a structure of printed circuit board conductors. The contact member 13 includes two independent contacts 13a and 13b and a common contact 13c. The contact pieces 12a and 12b of the contactor 12 fixed on the rotor contact with contacts 13a, 13b and 13c form a circuit connecting to the cornering lamps as described hereinafter. In this embodiment, the contact 13a is used for a cornering lamp for illuminating the right direction and the contact 13b is used for a cornering lamp for illuminating the left direction.

Figure 4:
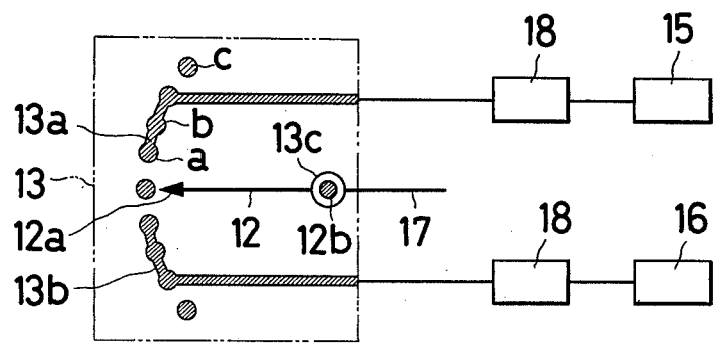
FIG. 4 is a schematic illustration showing the operation of the contact part used in the illustrated embodiment of the invention.

As shown in FIG. 4, cornering lamps 15 and 16 are provided on both sides in the front of a vehicle and are respectively connected to each independent contact 13a or 13b, if necessary, through the intermediary of respective current amplifiers 18. A common terminal 17 is connected to the contact 13c.

In operation, assuming that the disc 10 shown in FIG. 1 is in its neutral position in which the vehicle advances straight ahead, the contactor 12 fixed on the rotor 11 is, as shown in FIG. 4, in an open position at which it does not contact with either of the contacts 13a or 13b.

If the steering handle 2 is operated over 41° in the right direction, the disc 10 rotates for the same angle in relation to the handle 2. With this rotation, the rotor 11 is rotated for at least one pitch of the projections 11a by the actuating piece 10c and the contact piece 12a of the contactor 12 arrives at the position "a" (FIG. 4) so as to contact the contact 13a. In this case, because the contact piece 12b rotates at about the same point as the rotor 11, it does not separate from the common contact 13c. The cornering lamp 15 is thus connected to the common terminal 17 and a circuit is formed to conduct to electrical power (not shown) to the cornering lamp 15, whereby the corner lamp 15 lights to illuminate the advancing direction of the vehicle.

When the steering handle is operated by rotation thereof through 1.75 turns, which is usually allowed for vehicles, the protruding pieces 11a are first pressed by the actuating piece 10c, then, by the actuating piece 10b, and thereafter by the actuating piece 10c again. As a result of this, though the rotor 11 is rotated for three pitches of the projections 11a and the contact piece 12a of the contactor 12 advances to the "c" position of the contact 13, the cornering lamp 15 continues to light.

When the handle is returned to the original position and arrives at the neutral position, the contact piece 12a, in turn, returns in reverse order of the above description from the "c" position of the contact 13a and the cornering lamp 15 is turned off by stopping of the contact piece 12a at the open position of the contact piece 12a (shown in FIG. 4)

When the steering handle 2 is operated in the left direction, the cornering lamp 16 lights to illuminate the advancing direction of the vehicle if the rotary angle of the steering handle 2 is over 41°.

As understood from the above description, according to the switch device of the present invention the switching action can be automatically performed in response to the rotary angle of the steering handle.

In the above embodiment, though the two actuating pieces provided on the disc has been described to be at angular positions of ±41° in relation to the transverse axis X — X whereby the lighting action of the cornering lamp is obtained when the steering handle is rotated over 41°, it is to be understood that the foregoing description is a preferred embodiment of the disclosed device and that various changes and modifications may be made in the invention without departing from the spirit and scope thereof.

What is claimed is:

1. A switch device adapted to respond to operation of a steering handle which is operatively connected to a steering shaft for rotating the steering shaft about its longitudinal axis, the switch device comprising:
    actuating means fixed on a steering shaft for rotation in cooperation with operation of the steering handle, said actuating means having a plurality of actuating members;
    a rotatable member having means engageable with said actuating members of said actuating means and which is rotatable over a given angle upon engagement with at least one of said actuating members, said rotatable member including a contactor; and
    a contact member disposed in opposed relationship with said contactor so as to selectively contact with the said contactor upon rotation of said rotatable member.

2. A switch device according to claim 1 wherein said actuating means comprises a disc.

3. A switch device according to claim 2, wherein said actuating members are provided at positions of ±41° in relation to a transverse axis of said disc.

4. A switch device according to claim 1, wherein said actuating members are provided at positions of ±41° in relation to a transverse axis of said actuating means.

5. A switch device according to claim 1, wherein said rotatable member includes a plurality of protruding members formed to abut with said actuating members of said actuating means.

6. A switch device according to claim 5, wherein said actuating means comprises a disc and said actuating members project from said disc for abutting engagement with said protruding members of said rotatable members.

7. A switch device according to claim 6, wherein said rotatable member is disc shaped and said protruding members protrude from the periphery thereof, and said actuating members project from the periphery of said disc shaped actuating means.

8. A switch device according to claim 1, wherein said contactor includes one contact piece positioned at the center of rotation of said rotatable member and another contact piece positioned near the outer periphery of said rotatable member, said contact pieces being electrically connected together.

9. A switch device according to claim 8, wherein said contact pieces are a single integral member.

10. A switch device according to claim 1, wherein said contact member comprises printed circuit conductors on a board and includes two independent contacts and a common contact.

11. A switch device according to claim 1 comprising means coupling said contact member to lamps on a vehicle and to a source of power.

12. A cornering lamp system for a vehicle having a steering handle which is operatively connected to a steering shaft for rotating the steering shaft about its longitudinal axis, comprising:
    actuating means fixed on a steering shaft for rotation in cooperation with operation of the steering handle, said actuating means having a plurality of actuating members;
    a rotatable member having means engageable with said actuating members of said actuating means and which is rotatable over a given angle upon engagement with at least one of said actuating members, said rotatable member including a contactor;
    contact means disposed in opposed relationship with said contactor and comprising at least two contacts which are selectively contacted with said contactor upon rotation of said rotatable member; and
    first and second cornering lamp means coupled to respective ones of said contacts.

13. A system according to claim 12 further comprising a source of power coupled to said contactor for energizing said respective cornering lamp means when said contactor contacts a respective contact of said contact member.

14. A system according to claim 12 wherein said actuating means comprises a disc.

15. A system according to claim 14, wherein said actuating members are provided at positions of ±41° in relation to a transverse axis of said disc.

16. A system according to claim 12, wherein said rotatable member includes a plurality of protruding members formed to abut with said actuating members of said actuating means.

17. A system according to claim 16, wherein said actuating means comprises a disc and said actuating members project from said disc for abutting engagement with said protruding members of said rotatable members.

18. A system according to claim 17, wherein said rotatable member is disc shaped and said protruding members protrude from the periphery thereof, and said actuating members project from the periphery of said disc shaped actuating means.

19. A system according to claim 12, wherein said contactor includes one contact piece positioned at the center of rotation of said rotatable member and another contact piece positioned near the outer periphery of said rotatable member, said contact pieces being electrically connected together.

20. A system according to claim 12, wherein said contact member comprises printed circuit conductors on a board and includes two independent contacts and a common contact.

* * * * *